United States Patent [19]

Courtright

[11] 4,142,547
[45] Mar. 6, 1979

[54] IRRIGATION SYSTEM AND IMPROVEMENT STRUCTURE THEREIN

[76] Inventor: Burr Courtright, Rte. #1, Box 1685, La Grande, Oreg. 97850

[21] Appl. No.: 738,045

[22] Filed: Nov. 20, 1976

[51] Int. Cl.² .............................................. B05B 3/18
[52] U.S. Cl. ................................... 137/344; 239/184; 239/212
[58] Field of Search ................ 137/344; 239/177, 212, 239/213, 184

[56] References Cited

U.S. PATENT DOCUMENTS

| | | | |
|---|---|---|---|
| 3,444,941 | 5/1969 | Purtell | 137/344 |
| 3,484,046 | 12/1969 | Harris | 137/344 X |
| 3,848,625 | 11/1974 | Courtright | 137/344 |
| 4,006,860 | 2/1977 | Cornelius et al. | 239/212 |

FOREIGN PATENT DOCUMENTS 217436  5/1958  Australia ................................. 239/177

*Primary Examiner*—Martin P. Schwadron
*Assistant Examiner*—Gerald A. Michalsky
*Attorney, Agent, or Firm*—M. Ralph Shaffer

[57] ABSTRACT

In and for an agricultural irrigation system including an elongate, wheel-supported, irrigation wheel line, structural means such as a prime mover for translating such line in a given course of travel over an agricultural field and also for directly applying torque to the wheel line carried thereby. The subject structure includes means responsive to deflections or temporary irregularities in alignment of the wheel line for automatically varying the torquing speed of the line relative to the speed of translation of the structural means or prime mover, or vice versa, whereby to tend to return the line to its desired orientation, usually rectilinear.

1 Claim, 14 Drawing Figures

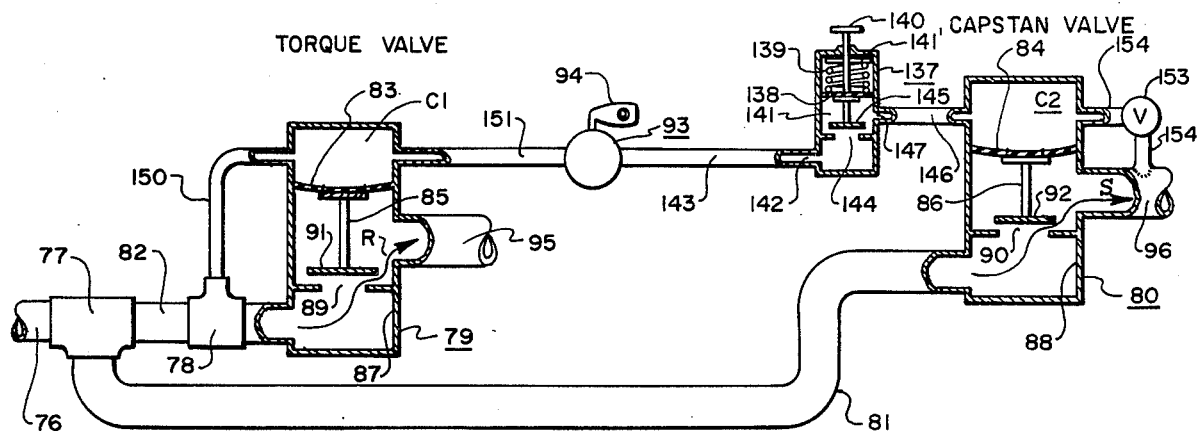
FIG. 2
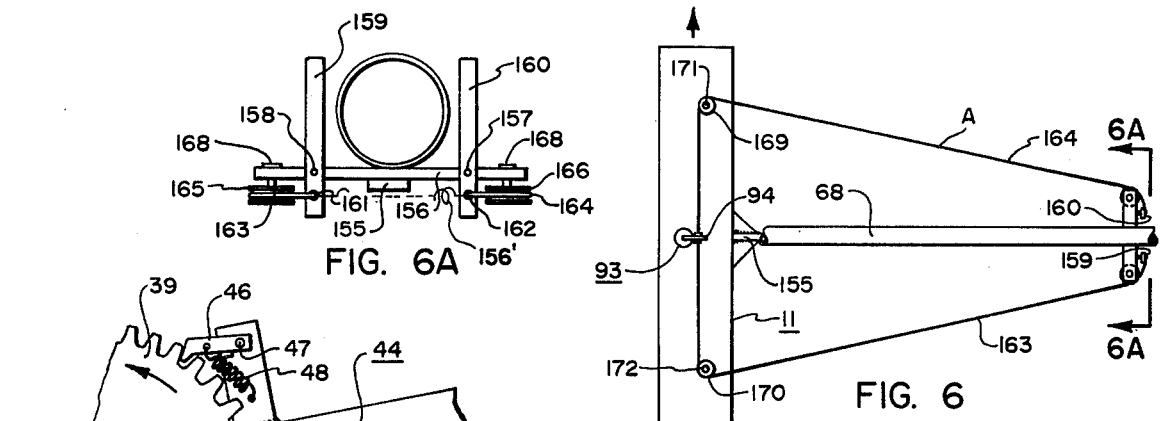
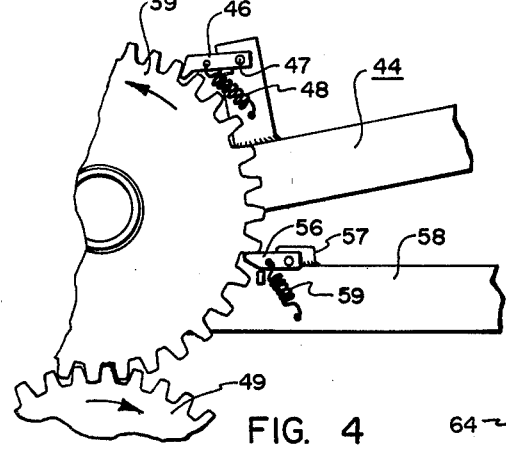
FIG. 4
FIG. 4A
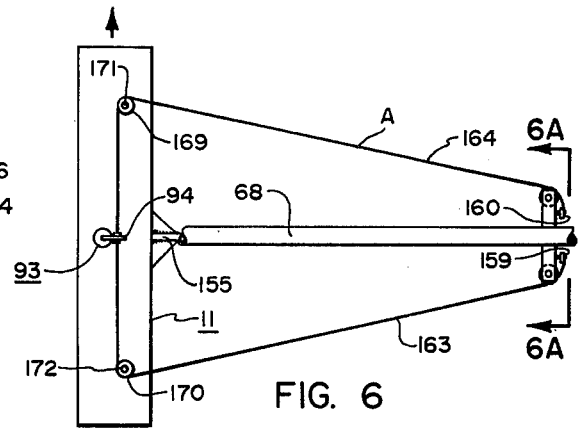
FIG. 6A
FIG. 6
FIG. 3
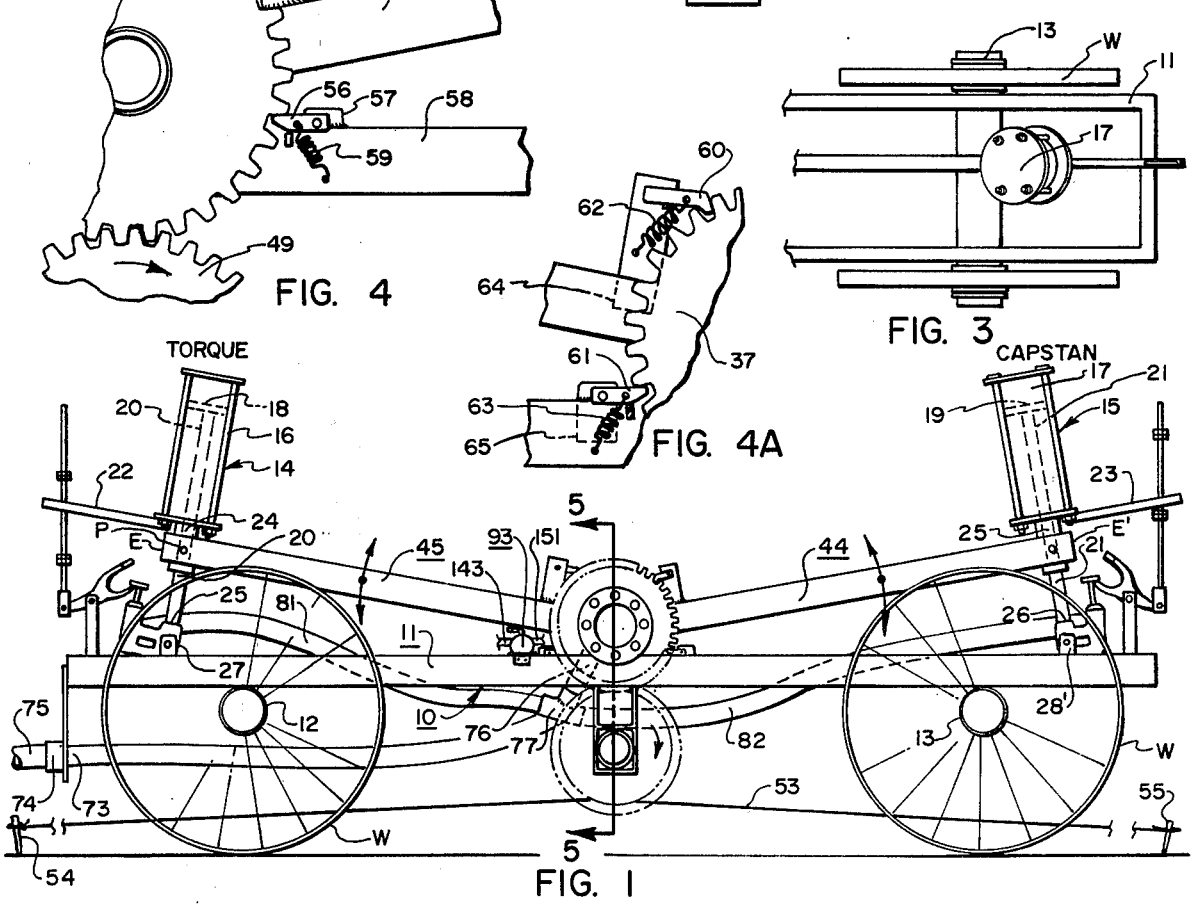
FIG. 1

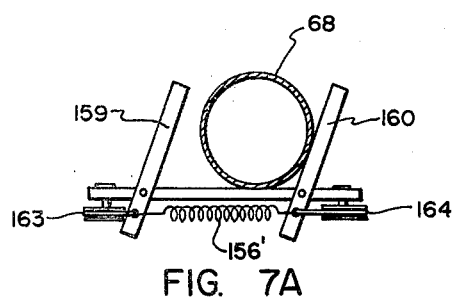
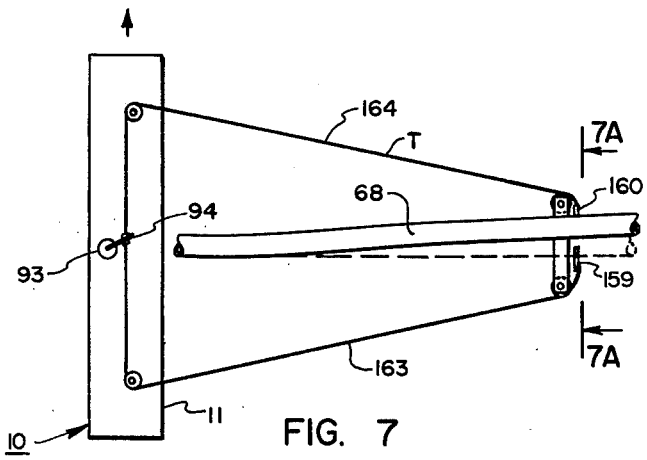
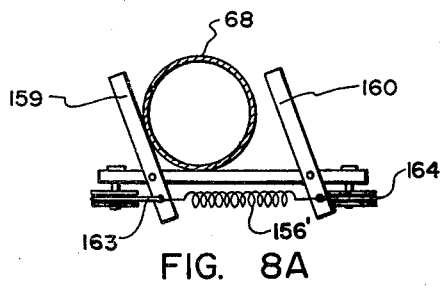
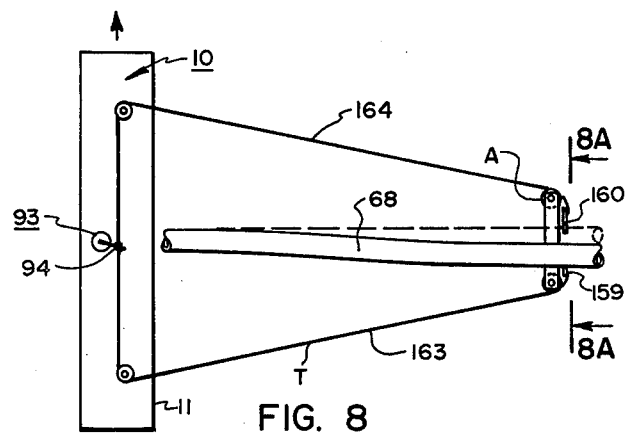
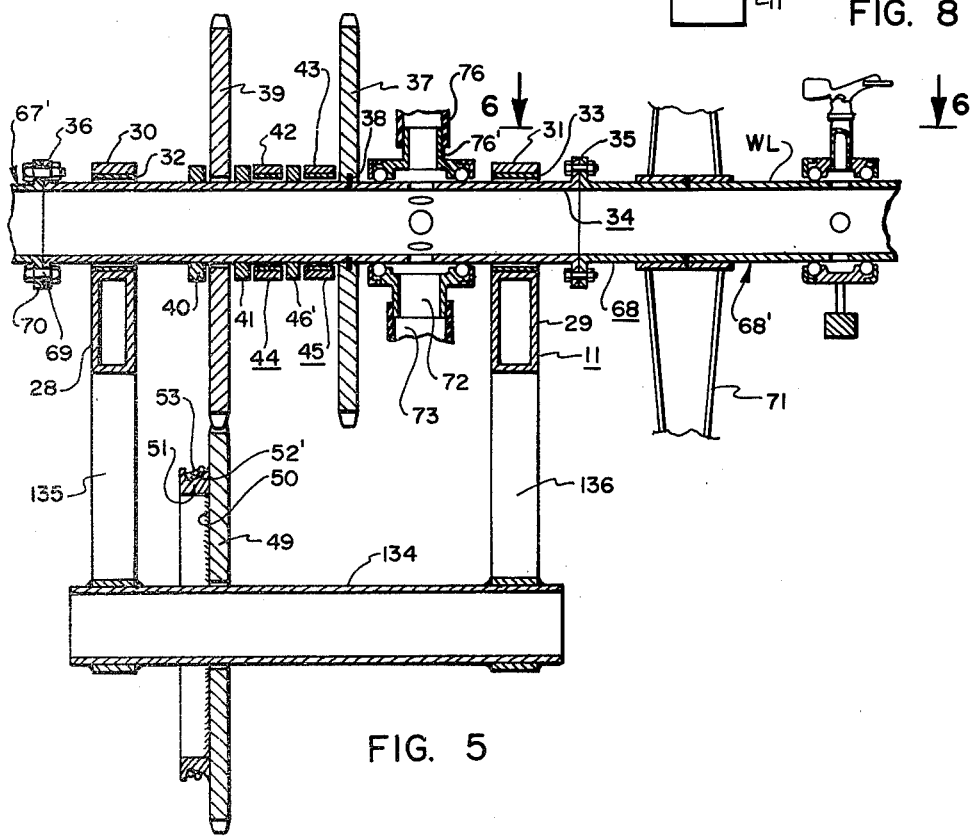

IRRIGATION SYSTEM AND IMPROVEMENT STRUCTURE THEREIN

FIELD OF INVENTION

The present invention relates to agricultural irrigation systems and, more particularly, provides a system including a novel prime mover or structural means designed to apply torque directly to an irrigation wheel line and to advance the wheel line so that a desired line condition, e,g, rectilinear, will be preserved during wheel line operation. The subject system includes means responsive to line deflection from its nominal intended condition or position for varying the ratio of line prime mover translational speed to the speed of revolvement of the line at a particular segment thereof, so that the line will advance uniformly even though torsional lag in the line, terrain undulations and irregularities, or other means would otherwise tend to cause line deflection, distortion, or even rupture.

Accordingly, the prime mover utilized and the system incorporating such prime mover is essentially self-correcting automatically.

DESCRIPTION OF PRIOR ART

Agricultural wheel lines are commonly known in the art and comprise an elongate central conduit supplying pressured water to sprinklers suitably positioned and mutually spaced along a line. The line itself is wheel supported, with wheels generally being keyed to the line along mutually spaced points.

Previously, as in the inventor's U.S. Pat. No. 3,848,625, pressured water from a field hose has been coupled directly to the prime mover or wheel-line associated structure for both supplying water to the central conduit of the wheel line and also to provide a pressured fluid to the prime mover for operationally torquing and advancing the wheel line over given terrain.

As shown in the subject patent it has been a practice to supply a translation structure such as a capstan, merely by way of example, which in wrapping itself about its cable stretched over a field, will advance the prime mover forwardly along an intended course staked out by such cable. Such advance of the prime mover, while capable of rotating a wheel line where the wheels are keyed to the central conduit thereof, nonetheless is greatly assisted by the application of torque to such wheel line. Such has been accomplished by supplying a gear keyed to the wheel line or an axial coupler thereof, and for driving such gear as well as the capstan with water pressure. It has been the practice to have a fixed speed ratio as between the torquing gear and the capstan.

The above is often inappropriate, especially where due to terrain undulations, dips and hills, the prime mover may tend to lead or lag the intended contour of the wheel line. Furthermore, the wheel line conduit, even though made of steel, will bend of deflect from its normal axial position, owing to the great lengths of the wheel line, one quarter-mile, or even more.

BRIEF SUMMARY OF THE INVENTION

The torquing gear of the wheel line is chosen to be independent of the translation drive of the prime mover advancing the wheel line over a field. Accordingly, means are provided the prime mover or associated structure so as to sense wheel line deflections, i.e. to sense whether or not the prime mover is leading or lagging a portion of the line spaced from such prime mover. The translation means of the prime mover is driven independently of the torquing gear, and the ratio of the speeds of both is adjusted or varied automatically in response to the direction and degree of deflection of the wheel line relative to its nominal intended position as to its prime mover. It is noted that the adjustment occurs automatically so that without tending by the farmer or user, the prime mover will automatically catch-up and slow-down to bring the line into its intended configuration, usually rectilinear. In a preferred form of the invention this is accomplished by reciprocating hydraulic jacks with associated structure to revolve the torquing gear of the wheel line and the capstan of the prime mover independently. Suitable valving means and appropriate linkage is made responsive to wheel line deflection relative to the prime mover orientation for adjusting the pressure flow to such jacks, thereby automatically controlling and varying the speed of revolvement of the torquing gear and/or capstan as needed.

OBJECTS

A principal object of the present invention is to provide an agricultural wheel line system, and prime mover or structural unit therefor, wherein the torquing speed supplied the central conduit of the wheel line can be adjusted relatively, with respect to the speed of translation effected by such prime mover, and vice versa.

A further object is to provide independently driven translational means and wheel-line direct-torquing means in a prime mover structure or operative structure associated therewith, wherein the speeds of the torquing means and prime mover translation are automatically adjustable in accordance with wheel line deflection sensed.

A further object is to provide in an agricultural wheel line system, a prime mover responsive to line deflection for advancing or retarding translational movement of such prime mover, relative to wheel line torquing speed, in accordance with the magnitude and direction of such wheel line deflection.

An additional object is to provide an improved agricultural irrigation system and operative structure associated therewith.

BRIEF DESCRIPTION OF DRAWINGS

FIG. 1 is a side elevation of a prime mover or structural unit constructed in accordance with the present invention.

FIG. 2 is a view of the valving system used, in one embodiment of the invention, to adjust water drive of the hydraulic jacks in FIG. 1, whereby to vary a ratio between the speed of the torquing gear and the translation-effective capstan with which the jacks are respectively independently coupled.

FIG. 3 is a fragmentary plan taken of the right hand portion of the structure in FIG. 1; it will be understood that a plan view of the left-hand portion of such structure will be identical, only reversed as to orientation as indicated generally in FIG. 1.

FIG. 4 is an enlarged fragmentary detail of the ratchet wheel and ratcheting lever structure, utilized to revolve the capstan that is freely journaled to the frame of the structure in FIG. 1.

FIG. 4A is similar to FIG. 4 but illustrates the lever means and pawl construction operatively associated with the wheel line torquing gear, designed to function for keyed revolvement with the central conduit of the wheel line employed.

FIG. 5 is an enlarged vertical section, taken along the lines 5—5 in FIG. 1, and illustrating the central conduit of the prime mover as being coupled to the central conduit of at least one wheel line section.

FIG. 6 is a plan view, essentially in schematic form, taken along the line 6—6 in FIG. 5, illustrating the deflection sensing apparatus associated with the prime mover and constructed for sensing deflection of the wheel line at a point somewhat remote from the frame of the prime mover of FIG. 11.

FIG. 6A is a sectional view taken along the line 6A—6A in FIG. 6, illustrating the sensing structure operatively associated with the central conduit of the wheel line.

FIGS. 7 and 7A are similar to FIGS. 6 and 6A, respectively, with FIG. 7A illustrating the condition wherein the prime mover tends to lag the wheel line such that that portion of the wheel line's central conduit nearest the prime mover bows inwardly as shown.

FIGS. 8 and 8A are similar to FIGS. 6 and 6A, illustrating the condition wherein the prime mover leads the wheel line in a manner such that the prime mover tends to bow outwardly.

DESCRIPTION OF PREFERRED EMBODIMENTS

Figure 9:
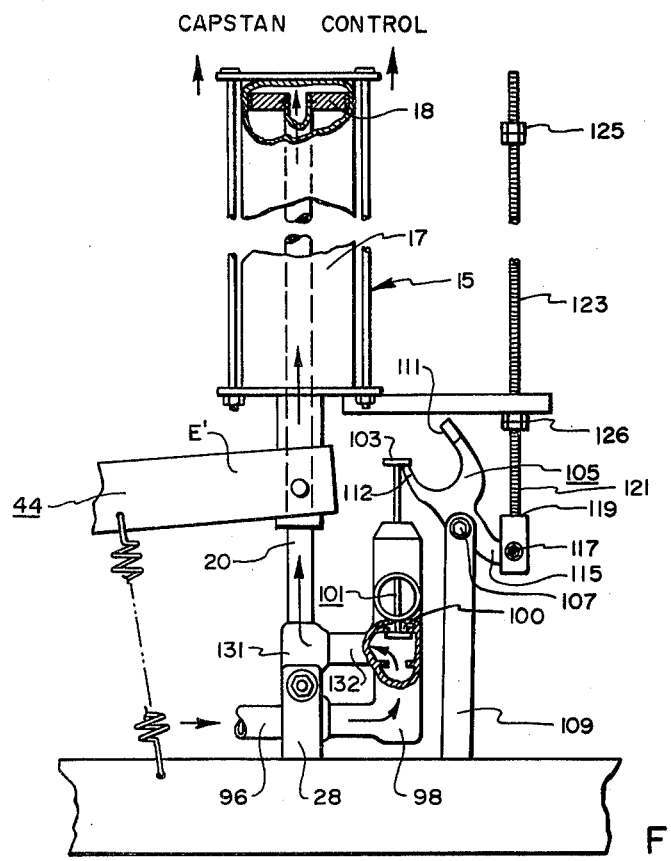
FIG. 9 is an enlarged side view of the right-hand side of FIG. 1, illustrating in enlarged detail and partially in section view, the reciprocating hydraulic jack structure, with structure operatively associated therewith, to rotate the capstan gear.

The structural unit or prime mover 10 includes a frame 11, similarly configured at opposite ends, and provided with front and rear axles 12 and 13, each being provided with a pair of wheels W. In a preferred embodiment of the invention the wheels are merely journaled for rotation upon the fixed axles 12 and 13.

Coupled to frame 11 at opposite ends are a pair of reciprocating hydraulic jacks 14 and 15 which take the form of hydraulic cylinders 16 and 17, being provided with respective pistons 18,19 and piston rods, 20,21 connected to and operatively associated therewith. Each of the cylinders 16 and 17 has a side extension 22 and 23, respectively, the operation of which will be described hereinafter. Cylinders 16 and 17 also each include a downwardly oriented hollow cylinder boss 24, and 25, which slidably journal the piston rods 20 and 21, respectively. The downward ends 25 and 26 of the piston rods are mounted by structures 27 and 28' to frame 11.

The opposite sides 28 and 29 of frame 11, see FIG. 5, carries journal mounts 30 and 31, each provided with respective bushings 32 and 33. Journaled in bushings 32,33 is a transverse wheel line coupler conduit 34 having opposite attachment flanges 35 and 36. The member 34 is constructed for connection to the central conduit 68 of a wheel line WL, either at one or both flanges thereof. If desired, the structural unit 10 may be mounted of course to simply one end of the agricultural wheel line, where but one segment is employed at a side of the unit 10, the opposite end at 36 simply being plugged.

Ratchet wheel or gear 37 is welded or otherwise secured at 38 to transverse conduit 34.

A second gear or ratchet wheel 39 is disposed for free revolvement upon member 34 and is maintained in place by positioning clamps 40 and 41. Journal ends 42 and 43 of lever arms 44 and 45, see FIG. 1, are maintained in place by clamps 41 and 46' and, as seen in FIG. 1, form portions of the capstan lever arm 44 and the torquing lever arm 45.

Lever arm 44, see FIG. 4, is provided with a spring-biased pawl 46, pivoted at 47 and spring-biased by anchor spring 48, such pawl serving to advance the ratchet wheel or gear 39 in a counter-clockwise direction. It is seen that such gear 39 meshes with the gear 49, see FIG. 5, which is welded at 50 to capstan spool 51. The outer surface of the capstan spool is recessed at 52 to provide for a capstan cable 53. Capstan cable 53 is stretched outwardly to be anchored by stakes 54 and 55, see FIG. 1, at opposite ends of the intended run over the agricultural field to be irrigated.

Returning to FIG. 4, it is seen that pawl 56 is mounted by bracket 57 to frame 58 and is spring-biased by spring 59. The lower pawl 56 is for the purpose of preventing the counter-revolvement or clockwise rotation of the gear 39 when the lever arm 44 is lowered at its right outer extremity in FIG. 1. Accordingly, representative one-way revolvement of torquing gear 37 is assured, the same as is the case for gear 39.

A similar construction exists in connection with the hydraulic jack 14 to the left of the structure in FIG. 1, wherein it is seen that the cylinder 16 is provided with a lever arm 45 that is pinned by pin means P to the forward extension 24 of the cylinder. Thus, the lower ends of each of the piston rods at 25 and 26 are stationary and are secured to the frame 11 in any conventional manner. It will be noted that the up and down movement of the respective cylinders 16,17 of the hydraulic jack mean at 14 and 15 will be accompanied by an up and down movement of the outer ends E and E' of lever arms 45 and 44. It is to be noted that pawls 60 and 61 are each provided with biasing springs 62 and 63, mounted to respective brackets 64 and 65. The former bracket is secured to the lever arm 45 whereas the lowermost bracket 65 is secured to the frame. It is noted that the two pawls 60 and 61 engage the torquing gear or wheel 37 which is pinned or welded at 38 to transverse tubular member 35 as hereinbefore explained. Accordingly, the up and down ratcheting of lever arm 45 would produce a succession of clockwise rotational displacements of the gear or wheel 37 so as to effect the application of torque to transverse coupler conduit 34 and also to the central conduit of the wheel line to which the same will be connected.

For convenience of illustration, see FIG. 5, wheel line sections 67' and 68', each having bolt attachments and connection flanges 70, will be provided with the usual wheels 71 pinned thereto, along with self-aligning sprinklers, all in a conventional manner.

The conduit 34 is provided with a slip coupling tee 72 that is journaled and sealed to conduit 34 as indicated in FIG. 5. Coupling tee 72 is provided with a conduit 73 that connects to hose coupler 74 carried by frame 11. Coupler 74 is constructed for connection to hose 75, which is dragged across the field being irrigated and is connected to a water pressure source.

A pressurized water tap 76' is made integral with and forms a part of the coupling tee 72. Conduit 76, see FIG. 2, leads to a pair of tees 77 and 78 which complete connection to valves 79 and 80 by means of conduit 81 and 82, as indicated. These valves 79 and 80 are standard pilot control valves incorporating rubber diaphragms 83 and 84 connecting to valves 85 and 86. The interior bodies 87 and 88 of each of these valves is provided with a valve opening 89 and 90 which is selectively opened and closed by the valve heads or gates 91 and 92.

Valve 93 may comprise a control valve that is either of the ball valve or needle valve type, for example, and incorporates movable control 94 to regulate fluid flow through such valve. Conduits 95 and 96 are connected to valves 97 and 98 in FIGS. 9 and 10. These valves are identical in construction and include respective valve openings 99 and 100, as well as interior valves 101 and 102 provided with upper reaction means 103 and 104. These will comprise simply accessible valve heads. Kindly note fully incorporated U.S. Pat. No. 3,980,098, by the same inventor as herein. Yokes 105 and 106 are pivoted by attachment means 107 and 108 to upstanding frame members 109 and 110. The yokes 105 and 106 each include fingers 111–114 as indicated, constructed to engage the reaction tops 103 and 104 of valves 101 and 102. The tails 115 and 116 of the yokes are pivoted by attachment means 117 and 118 to blocks 119,120 into which the downwardly extending threaded ends 121 and 122 are inserted and threaded. These ends comprise portions of rods 123 and 124 which serve as actuator rods, incorporating limit-stop nuts 125–128 as indicated. Elbows 130 and 131 or other connection means including stub conduit 132 and 133 interconnect the hollow piston rods 21,20 with the valves indicated as shown and anchored to frame 11 by structures 27 and 28.

Figure 10:
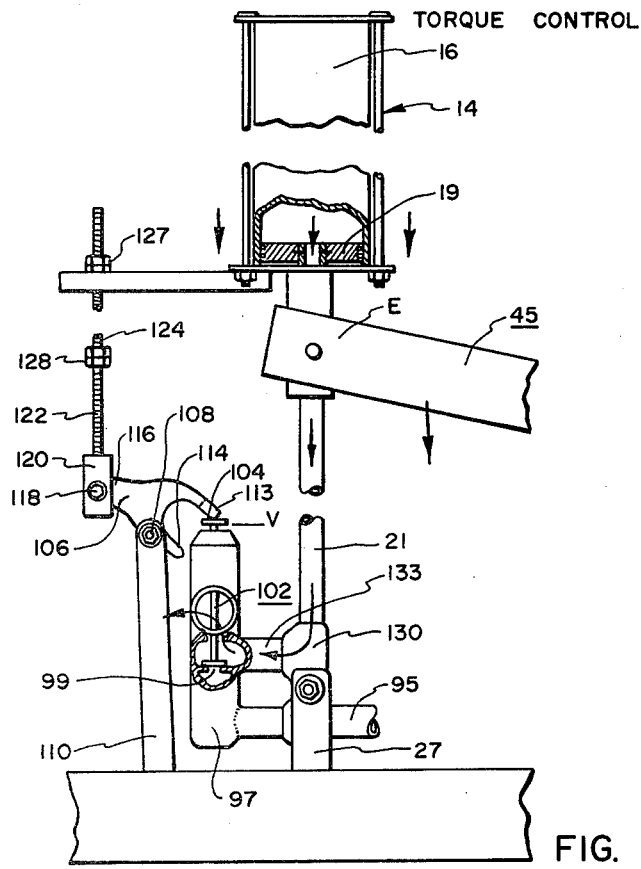
FIG. 10 is a side view of the left-hand portion of FIG. 1, illustrating the reciprocating hydraulic jack and lever structure used for rotationally displacing in successive moves the torquing gear affixed to the wheel line or a coupler thereto.

The operation of the structure is as follows:

In consideration first of the structure of FIGS. 1, 9 and 10, it is seen that, assuming for the moment that equal pressure is available at conduits 95 and 96, the cylinders 16 and 17 will reciprocate up and down relative to their pistons and piston rods so as to impart a reciprocating movement to the ends E and E' of members 44 and 45. For convenience of illustration and to show the operation of each reciprocating jack or cylinder means, the view of the left-hand or line torquing jack 14 is shown in FIG. 10. It will be understood that the structure is the same and the operation the same for both hydraulic jacks 14,15 as to inlet of fluid into the cylinder and exhaust therefrom, thereby reciprocating the respective lever arms 44,45. Thus, assuming for the moment equivalent water pressure at conduit 95 and 96, the capstan will be progressively rotationally displaced by the lever arm 44 in a manner above described. Correspondingly, the torquing gear will be successively rotationally displaced by the lever arm 45. Such displacements are effective through the pawls 46 and 60 as aforesaid, with reaction pawls 56 and 61 serving to prevent counter rotation. Accordingly, torquing of the transverse tubular conduit 34 in FIG. 5 will be in a direction to torque the wheel line WL, namely, the central conduit 68 and wheels 71 keyed thereto in a direction to the right in FIG. 1. Simultaneously, the torquing of the gear 39 meshing with the capstan gear 49 will advance the capstan in a clockwise direction so as to advance the capstan along its cable 53.

As to the capstan and its gear at 49, the same are freely journaled on shaft 134 which in turn is journaled by the arms 135 and 136 welded to and depending from frame portions 28 and 29.

In returning now to FIG. 2, there should be completed the automatic control circuit. It is noted that a supplementary, system-adjusting valve 137 is provided, the same including a rubber diaphragm 138 as the other valves at 83, 84, but also being provided with a compression spring 139, the compression force of which is adjusted by adjustment screw 140. The latter incorporates a bearing portion 141' that compresses the spring and hence regulates the protrusion of the rubber diaphragm 138 into the valve body at 141. The valve 137 includes inlet port 142 to which is connected conduit 143 leading from valve 93. The gate opening 144 is selectively opened and closed by the valve gate 145. Outlet conduit 146 is connected to outlet port 147 of the valve.

Valve 137 is smaller than the other two valves indicated at 79 and 80. However, there is a manually adjustable spring bias, via spring 139 and adjustment screw 140, to control the set deflection of the diaphragm 138, which thus controls the effective opening through the combination of valve element 145 and opening 144.

In operation as to FIG. 2, let it be assumed that valves 93 and 137 are preadjusted for equivalent flow through the valve 79, see arrows R and S, so that equivalent water under pressure is fed to the two cylinders 16 and 17. In such event, both cylinders with their ratcheting levers 44,45 will be operated essentially equivalently so that there will be an equivalent progression to the right of the unit, by virtue of capstan revolvement upon taut cable 53, and the torque applied to the transverse conduit 34 in FIG. 5 and the wheel line structure coupled thereto. Let it be assumed that valve 93 is in a mid-point or mid-flow condition. At full flow condition, valve 93 will pass all of the water fed to it by pilot conduit 150,151 so that essentially no pressure will exist in cavity C1, thereby tending to open further the valve 79 at opening 89, owing to an upper withdrawal of the valve gate 91. Such an excessive flow, however, will cause a downward pressure on diaphragm 84 of valve 80, owing to the increased pressure at C2, since valve 153, interposed between conduit 154 and 155, will be a flow reduction valve. The increase of pressure in cavity C2 will distend the diaphragm 84 downwardly so as to tend to close the valve opening 90 and shut off flow through conduit 96 leading to cylinder 17 in FIG. 9.

The situation is not merely an on-off condition, however; thus, the flow condition can be varied by controlling the setting of variable-flow valve 93.

Should the control 94 of valve 93 be diverted to the left or to the right, then there will be an increase in the flow at R in FIG. 2 and a decrease in the flow at S, or vice versa, this in accordance with the flow conditions of valve 93. Again, the trend toward closing the valve 93 will build up pressure in cavity C1 so as to distend diaphragm 83 downwardly and tend to close the opening 89, but this in turn will reduce pressure in cavity C2 so as to tend to increase flow in direction S within valve 80. Valve 137, again, is simply an adjustment device so that an accurate preload can be made as to each diaphragm 83,84.

What obtains, therefore, is an automatic readjustment of water pressure at cylinder inlet conduit 95,96 in FIGS. 2, 9 and 10, this in accordance with the particular setting of the valve 93.

Valve 93, while manually operable, is chosen to be fully automatically operable in connection with certain deflection sensing apparatus as illustrated in FIGS. 6, 6A, 7, 7A and 8, 8A. Assume a wheel line 68 is coupled to the apparatus in the manner shown in FIGS. 5 and 6. An arm extends outwardly from frame 11, namely, arm 155, which has secured at its end an cross arm 156 to which are pivoted, by pivot means 157 and 158, a pair of upright arms 159 and 160. These are wheel-line deflection sensing arms or levers and, at their bases, are secured at points 161 and 162 to cables 163, 164 and spring 156′. These cables pass about pulleys 165 and 166 which are pivoted by attachment means 167 and 168 to cross-arm 156. Cables 163 and 164 pass about frame pulleys 169 and 170, form a loop as shown in FIG. 6, and are joined together and to the control arm 94 of valve 93. Again, valve 93 may be a needle valve, ball valve, or other type of adjustable valve for controlling pressured flow. Pulleys 169 and 170 may be mounted to the frame 11 in any conventional manner as by pins 171 and 172.

A similar condition is shown in FIG. 7, wherein the prime mover or unit 10 lags the rest of the line. In such event the normally 90° relationship between the line 68 and the frame 11 will be disturbed so that there is a slight deflection forwardly of the wheel line 68 as one proceeds from the sideboard of the frame outwardly. In such event, there is an outboard urging of the pivoted lever 160 which is accompanied by a tension T on the cable 164, thereby tending to urge the valve control 94 in a direction shown in FIG. 7. Since the end of cable 163 is likewise connected to this valve control, there will be a slack introduced in cable 163 which is taken up of course by the movement of the valve handle or control 93. The condition in FIGS. 7 and 7A thus obtain where there is a lagging of the prime mover relative to the wheel line.

In the second situation, assume that the frame 11 leads the rest of the wheel line as shown in FIG. 8. In such event, there is a reverse operation, to wit, the wheel line central conduit of line 68 engages lever 159 so as to produce a tension T in cable 163. The resulting slack in cable 164 is taken up by the control that is now displaced rearwardly at 94 in FIG. 8.

The condition of valve 93 in FIG. 7, see also FIG. 2, is that this valve, is now sensing the forward deflection of the wheel line, will tend to bring more fluid under pressure through conduit 96 leading to the capstan cylinder. Valve 93 will be essentially closed, so as to build up pressure in cavity C1 and hence close the valve at 89 which is connected to the torquing gear cylnder 16, or at least tending to close such valve. Thus, there is a reduction in torque applied by the torquing gear, owing to reduced or no-flow condition through conduit 95. The increased flow through conduit 96, however, will cause the capstan revolvement to speed up so that the frame 11 will tend to catch up to the orientation of the line as shown in FIG. 6, thereby tending to straighten the line since the condition in FIG. 6A will have been reached, to re-establish equilibrium in the system.

In the event where the drive of the capstan is excessive to the extent that the frame 11 of the prime mover leads essentially the rest of the line, then a bowing exists in the configuration of wheel line 68 as shown in FIG. 8. The rear, pivoted lever 159 in FIG. 8A now senses this so as to produce a tension in line 163 and a displacement of the valve control 94 as before explained. This serves to open valve 93 so as to reduce the pressure on diaphragm 83 and thereby increase the flow out through conduit 95 leading to the torquing gear cylinder 17. Simultaneously, there will be a build-up of pressure in cavity C2 to tend to close the valve 80 leading to the capstan cylinder line 76.

It is thus seen that what is provided is an automatic pressure-flow adjustment in accordance with the condition of the sensing apparatus in FIGS. 6 and 8, by way of example. Thus, the deflection sensing of deflections in the wheel-line central conduit relative to the prime mover adjusts valve conditions of valves 79 and 80 in FIG. 2, thereby to regulate flow to the capstan and torquing cylinders automatically, and thereby appropriately regulate the ratio of the relative speeds of cylinder movement and hence the ratio of the speed of the torquing gear to the drive unit of the capstan. Accordingly, the user may leave the unit in the field and simply start the same, confident that for any type of deflection of the wheel line proximate the deflection sensing apparatus, and of whatever magnitude and direction, the system will self-compensate automatically for such deflection to tend to keep the wheel line straight as it advances across the field.

While particular embodiments of the invention have been shown and described, it will be obvious to those skilled in the art the various changes and modifications which may be made without departing from the essential features of the present invention and, therefore, the aim in the appended claims is to cover all such changes and modifications as fall within the true spirit and scope of the invention.

I claim:

1. An agricultural irrigation system including, in combination, an elongate irrigation line provided with spaced, supporting, keyed wheels, first means for translating said irrigation line in a direction transverse to said line, second means coupled to said line for applying mechanical torque to said line, and third means responsive to irrigation line deflection for automatically progressively adjusting at least one of said first and second means throughout operation-range thereof to vary the ratio of the speed of revolvement of said irrigation line proximate said first means to the speed of translation of said irrigation line proximate said second means, whereby to tend to correct said deflection, wherein said first and second means each comprises hydraulic jacks; said third means including: first valve means, having a control, for proportioning liquid-flow to said hydraulic jacks; a fluid inlet coupled to said first valve means; said irrigation-line sensing means attached to said control for operationally moving said control, whereby to vary progressively such liquid-flow proportioning, and wherein said third means includes a pair of branch fluid lines coupled in parallel to said fluid inlet, second and third valve means respectively coupled between said fluid inlet and said hydraulic jacks, and hydraulic circuit means hydraulically coupled to said fluid inlet and said second and third valve means and including said first valve means for variably proportioning fluid flow through said second and third valve means.

* * * * *